United States Patent [19]

Herzig

[11] 4,124,560
[45] Nov. 7, 1978

[54] TWO-COMPONENT SILICONE RUBBER

[75] Inventor: Joachim Herzig, Leichlingen, Germany

[73] Assignee: Bayer Aktiengesellschaft, Leverkusen, Germany

[21] Appl. No.: 821,444

[22] Filed: Aug. 3, 1977

[30] Foreign Application Priority Data

Aug. 26, 1976 [DE] Fed. Rep. of Germany ....... 2638452

[51] Int. Cl.$^2$ .............................................. C08L 83/04
[52] U.S. Cl. ................................. 260/37 SB; 260/34.2
[58] Field of Search .................................... 260/37 SB

[56] References Cited

U.S. PATENT DOCUMENTS

| | | | |
|---|---|---|---|
| 3,642,685 | 2/1972 | Matherly | 260/37 SB |
| 3,696,127 | 10/1972 | Matherly | 260/37 SB |
| 3,888,815 | 6/1975 | Bessmer et al. | 260/37 SB |
| 3,897,376 | 7/1975 | Lampe | 260/37 SB X |
| 3,919,136 | 11/1975 | Smith | 260/37 SB X |

Primary Examiner—Lewis T. Jacobs
Attorney, Agent, or Firm—Sprung, Felfe, Horn, Lynch & Kramer

[57] ABSTRACT

A room temperature vulcanizable silica-containing silicone rubber can be produced without pretreatment of the silica by mixing specified amounts of (a) a linear organopolysiloxane of the formula

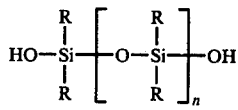

(b) silica of a specific surface area of at least about 50 m$^2$/g in the presence of water and a modifying agent of the formula $(R_3Si)nX$, then adding

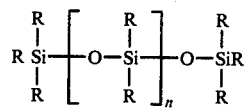 c)

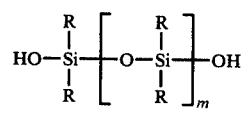

d)

and (e) another filler or pigment, this constituting a first component which is mixed with a second component which comprises (f) a silicic acid ester of the formula (RO)$_3$SiR'

(g) a heavy metal catalyst, and
(h) a monohydric aliphatic alcohol of the formula R—(CH$_2$)$_a$—OH Even though the silica is not pretreated as was heretofore necessary, the mixtures exhibit good flow properties and the rubber is characterized by improved mechanical properties.

5 Claims, No Drawings

TWO-COMPONENT SILICONE RUBBER

This invention relates to two-component silicone rubber compositions which vulcanize at room temperature and which are distinguished by improved mechanical properties and good flow properties.

Organopolysiloxanes which harden at room temperature in the presence of crosslinking agents, such as silicic acid esters for example, to form elastomers have been known for many years under the name of two-component silicone rubber. The starting materials used are organopolysiloxanes containing terminal hydroxyl groups which, by admixture with a silicic acid ester acting as a crosslinking agent, harden at room temperature in the presence of metal-containing catalysts to form elastomers. For processing systems of this type, it is desirable for the organopolysiloxane component to show as high a degree of fluidity as possible both on its own and after addition of the component containing the catalyst and crosslinking agent. However, the main disadvantages of hitherto known two-component compositions of this type which harden at room temperature to form elastomers are their relatively poor physical properties and, in particular, their extremely poor tear resistance.

Numerous attempts have been made to produce two-component silicone rubber of which the vulcanizates show improved tear resistance and tear propagation resistance. A significant improvement in this direction can be obtained by using as filler very finely divided, pyrogenically obtained silicon dioxide with a BET specific surface area of at least 50 m$^2$/g. Although the use of very finely divided silicon dioxide as filler in two-component silicone rubber crosslinkable at room temperature leads to an improvement in the strength values, the mixture of polyorganosiloxane and very finely divided silicon dioxide loses its fluidity even when only small quantities of the filler are added and can no longer be processed after addition of the crosslinker. Quantities of more than 15% by weight of filler, such as are required for a distinct improvement in the mechanical properties, give completely rigid mixtures without the least fluidity. The reason for the behavior is attributable to the presence of free hydroxyl groups on the filler which interact with the organopolysiloxane and lead to a "structuring" of the mixture.

Very finely divided pyrogenic silica which, before being worked into the polyorganosiloxane component, has been treated with an agent which is capable of irreversibly reacting with the free hydroxyl groups and of hydrophobizing the silica leads to the required property spectrum of the compositions. Hydrophobic silicas can be worked into the polyorganosiloxane in such large quantities that fluid mixtures are obtained which, after addition of the crosslinking component, give vulcanizates with improved physical properties. Various processes have been described for modifying the surface of silica in the required manner by reaction with hydrophobizing agents.

The hydrophobizing treatment of the silica is preferably carried out with reactive organosilicon compounds, optionally in the presence of a catalyst which accelerates the hydrophobizing process. Suitable hydrophobizing agents which have already been described as such are octamethyl cyclotetrasiloxane, hexamethyl cyclotrisiloxane, silazanes, alkoxy silanes or even short-chain OH-group-containing polyorganosiloxanes either on their own or in the presence of catalysts, such as ammonia, ammonium compounds, amines, heavy metal compounds or acids. The reactions may be carried out in the gas phase, in a solvent or in aqueous solution (cf. for example U.S. Pat. Nos. 2,938,009 and 3,334,062; German Auslegeschrift No. 1,158,196; and German Offenlegungsschrifts Nos. 1,567,490, 2,359,619 and 2,000,396).

All known processes are attended by the disadvantage that, before it can be used as a filler, the very finely divided pyrogenic silica has to be subjected to an elaborate process in which considerable volumes have to be handled and in which the actual charging is difficult to carry out and is accordingly expensive.

Accordingly, an object of the present invention is to provide fluid mixtures which give vulcanizates with improved properties and which contain non-surface-modified silica as filler.

Accordingly, the present invention provides two-component silicone rubber compositions vulcanizing at room temperature produced from component I consisting essentially of:

(a) about 20 to 100 parts by weight of a linear organopolysiloxane corresponding to the general formula:

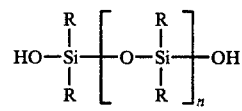

in which

R represents identical or different monofunctional hydrocarbon radicals, and the number $n$ is a positive integer of which the value is such that the viscosity amounts to between about 500 and 1,000,000 cP at a temperature of 25° C., (b) 0 to about 50 parts by weight of a linear organopolysiloxane corresponding to the general formula:

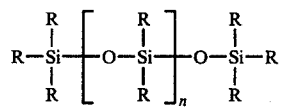

in which

R has the same meaning as in (a) and $n$ is a positive integer of which the value is such that the viscosity amounts to between about 5 and 1,000 cP at a temperature of 25° C., (c) 0 to about 20 parts by weight of a linear organopolysiloxane corresponding to the general formula:

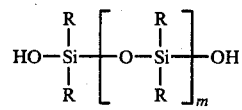

in which

R has the same meaning as in (a) and $m$ is a positive integer of which the value is such that the viscosity amounts to between about 2 and 50 cP at a temperature of 25° C., (d) about 10 to 50 parts by weight of a very finely divided pyrogenic silica with a specific surface area according to BET of at least about 50 m$^2$/g, (e) 0 to about 100 parts by weight of another filler or pigment, and from component II consisting essentially of (f) about 20 to 50 parts by weight of a silicic acid ester corresponding to the general formula:

$$(RO)_3SiR'$$

in which
R is as defined above, and
R' represents an alkyl or alkoxy radical with up to 6 carbon atoms, (g) about 1 to 20 parts by weight of a catalytically active heavy metal compound, (h) 0 to about 50 parts by weight of a monohydric, lower aliphatic alcohol corresponding to the general formula:

$$R-(CH_2)_a-OH$$

in which
R is as defined above, and
$a$ is a positive integer from 1 to about 10, preferably about 2 to 5, and distinguished by the fact that component I is a mixture produced by mixing constituents (a) and (d) in the presence of water and a modifying agent:

$$(R_3Si)_nX$$

in which
R is as defined above,
$n$ is the number 1 or 2 and
X represents OH, OR, halogen, S, OOCR or NY (Y = a monofunctional hydrocarbon radical or hydrogen), and subsequently adding constituents (b), (c) and (e).

It has surprisingly been found that fluid mixtures with improved mechanical properties are also obtained when the treatment of the pyrogenic silica is carried out during, rather than before, the process of incorporation into the polyorganosiloxane.

The above-mentioned constituent (a) of the first component of the two-component silicone rubber is a linear polyorganosiloxane of which the molecular chain contains terminal hydroxyl groups and in which $n$ is a positive integer of which the value is such that the viscosity of the siloxane is in the range of from 500 to 100,000 cP at a temperature of 25° C. The preferred embodiment of the present invention uses a diorganopolysiloxane with a viscosity of about 5000 to 20,000 cP at 25° C.

The radical R is preferably a monofunctional hydrocarbon radical or a substituted monofunctional hydrocarbon radical. R preferably represents alkyl radicals, such as, for example, methyl, ethyl, propyl, butyl or hexyl; aryl radicals such as, for example, phenyl or diphenyl; alkaryl radicals such as, for example, tolyl, xylyl or ethylphenyl; aralkyl radicals such as, for example, benzyl or phenylethyl; halogen-substituted aryl and alkyl radicals such as, for example chlorophenyl, tetrachlorophenyl or difluorophenyl; and alkenyl radicals, such as, for example, vinyl or allyl. In addition, R also represents cyanoalkyl, cycloalkyl and cycloalkenyl radicals. With particular preference, about 70 to 100% of the radicals R consist of methyl radicals, the remaining radicals preferably being methyl, vinyl or phenyl radicals. In order to adjust a desired viscosity, it is also possible to use mixtures of diorganopolysiloxanes differing in viscosity as the constituent (a).

Constituent (b) of the first component is a linear polyorganosiloxane, terminally blocked by triorganosiloxy groups, which may be added to the mixture in a quantity of 0 to 50 parts by weight and preferably in a quantity of about 20 to 40 parts by weight. Depending upon the value of the number $n$, the viscosity may amount to between 5 and 1000 cP, preferably to between about 10 and 100 cP and, with particular preference, to between about 10 and 50 cP at a temperature of 25° C. R has the same meaning as defined for constituent (a). The object of constituent (b) is to lower the viscosity of the mixture and to influence the mechanical properties of the vulcanizates of the two-component mixture vulcanizing at room temperature in such a way that the Shore-A-hardness is reduced by comparison with vulcanizates in which constituent (b) is absent.

Constituent (c) is a low molecular weight linear polyorganosiloxane of which the molecular chain contains terminal hydroxyl groups in which R has the same meaning as defined for constituent (a). With particular preference, 100% of the radicals R represent methyl groups. The value of the number $m$ determines the length of the molecular chain and is selected in such a way that the viscosity of the compound amounts to between 2 and 50 cP and preferably to between about 10 and 50 cP at a temperature of 25° C.

Constituent (c) is also used to lower the viscosity of the mixture and, even when added in small quantities, shows a distinct viscosity-reducing effect without in any way influencing the mechanical properties of the vulcanizates. The reduction in viscosity is accompanied by an increase in the processing time. The processing time is defined as the period of time for which the material continues to flow satisfactorily. Under the effect of the viscosity-reducing additives, the processing time begins at a lower viscosity than in the absence of such an additive and, under otherwise the same conditions, a longer period of time is required to obtain a viscosity at which the crosslinker-containing mixture ceases to flow, indicating the end of the processing time.

By using constituent (b), it is possible to lower the viscosity of the mixture and to lengthen the processing time while, at the same time, influencing the mechanical properties of the vulcanizates. By using constituent (c), it is possible to lower the viscosity of the mixture and to increase the processing time without at the same time influencing the mechanical properties of the vulcanizates.

By simultaneously using constituents (b) and (c), it is possible to influence the viscosity and processing time on the one hand and the mechanical properties of the vulcanizates on the other hand independently of one another.

Constituent (d) is a standard commercial-grade very finely divided silica with a BET specific surface area of at least 50 m²/g, preferably about 100 to 500 m²/g and, with particular preference, about 120 to 250 m²/g. Constituent (d) is preferably a silica pyrogenically obtained in the gas phase. The process by which the silica is produced is not a critical factor. The only important factor is that the surface should lie within the limits indicated above. Another important factor is that there is no need to use a silica which has been modified after its production. Instead it is possible to use silicas which are commercially available and in which variations in quality and analytical values according to the tolerance data supplied by the manufacturers have no adverse effects upon the mixture crosslinkable at room temperature in the context of the invention. Values which may readily be determined by analysis are regarded as being the BET specific surface area, the water content according to Fischer's method (cf. ASTM Special Technical Bulletin No. 51, 1941, page 95), the pH-value and the apparent density.

Fillers of a different type may be added to the two-component silicone rubber mixtures crosslinkable at room temperature as additional constituent (e) to the silica described in (d). These additional fillers may be surfacetreated or untreated fillers. They may be present in quantities of from 0 to 100 parts by weight and preferably in quantities of from 0 to about 50 parts by weight. The type of additional fillers used and the quantities in which they are used influence the consistency and the flow properties of the mixtures containing the constituents (a), (b), (c) and (d) and influence the physical properties of the vulcanizates. Examples of the many fillers which may be used for this purpose are titanium dioxide, Lithopone (Trade Mark), zinc oxide, zirconium silicate, silicon dioxide aerogel, diatomaceous earth, calcium carbonate, precipitated silicon dioxide, glass fibers, magnesium oxide, zirconium oxide, aluminum oxide, crushed quartz and calcined clay. In addition it is possible to add other additives such as solvents or organic plasticizers.

The second component of the two-component silicone mixtures vulcanizable at room temperature contains the following individual constituents: constituent (f) is a silicic acid ester acting as crosslinker and corresponding to the general formula:

$$(RO)_3SiR'$$

in which
R represents a monofunctional, substituted or unsubstituted hydrocarbon radical and R' represents a monofunctional substituted or unsubstituted hydrocarbon radical or is an alkoxy radical derived from the series of lower aliphatic alcohols containing from 1 to about 5 carbon atoms. Partially condensed or partially hydrolyzed silicic acid esters corresponding to the above general formula may also be used as crosslinkers. In addition to other factors, the quantity in which the silicic acid ester is used determines the velocity of the crosslinking reaction and amounts to between about 1 and 10 parts by weight, based on the first component of the two-component rubber mixture vulcanizing at room temperature. It is preferred to use about 2 to 5 parts by weight of a silicic acid ester based on the first component in which R is an ethyl or n-propyl radical and R' is an ethoxy or n-propoxy radical.

The radical component contains a heavy metal compound as catalyst for the crosslinking reaction.

The metal ion of the heavy metal salt is selected from the class consisting of lead, tin, zirconium, antimony, iron, cadmium, barium, calcium, titanium, bismuth and manganese. Accordingly, examples of suitable metal salt catalysts are tin naphthenate, lead octoate, tin octoate, iron stearate, tin oleate, antimony octoate, tin butyrate, basic dibutyl tin laurate and dibutyl tin dilaurate. The tin and lead salts are preferred.

A lower alcohol corresponding to the general formula:

$$R-(CH_2)_n-OH$$

may be present as a further constituent of the second component in a quantity of from 0 to 50 parts by weight. In this formula, R has the meaning defined under (a). R is preferably a methyl radical and $n$ is an integer from 2 to 5. The function of the alcohol component is to dilute the crosslinker mixture and to impart to the mixture of components (1) and (2) of the two-component mixture vulcanizable at room temperature, after the addition and stirring of component (1) with component (2), such a viscosity that air stirred in can escape on its own. The lower aliphatic alcohol is not essential to the function of the two-component mixture vulcanizable at room temperature and may be absent.

The important feature of the present invention is that the very finely divided silicas are incorporated in a hitherto unknown manner, making it possible to produce fluid two-component silicone rubbers with improved physical properties which can be crosslinked at room temperature. According to the invention, there is no need for the very finely divided silica to be surface-modified before it is incorporated. It is thus possible to produce fluid two component mixtures with improved physical properties much more easily and at far less cost than has hitherto been the case. The very finely divided silica is incorporated by surface-modifying the silica in the required form during the process of incorporation in the presence of constituent (a). To this end, the modifying agent has to be added to constituent (a) before the silica is added. The modifying agent used is a substance which is capable of modifying the surface of the silica in the required manner in the absence of an additional catalyst, but which does not enter into a chemical reaction with constituent (a) under the reaction conditions selected. It has been found that compounds corresponding to the general formula:

$$(R_3Si)_nX$$

are capable of modifying the fillers used in the invention in the required manner in the presence of component (a). In this formula, R has the meaning defined under (a), $n$ is an integer and has the value 1 or 2 and X is an organic radical of the formula OH, OR, halogen, S, OOCR or NY (in which X and R are as defined under (a) and Y is a monofunctional hydrocarbon radical or hydrogen). The following are mentioned as examples of these compounds: trimethyl chlorosilane, trimethyl ethoxy silane, triorganosilyl mercaptans, such as trimethyl silyl mercaptan, triorganosilyl acylates, such as vinyl dimethyl acetoxy silane, triorganosilylamines and hexamethyl disilazane.

According to the invention, particularly preferred compounds are compounds in which the radical R is a methyl radical and the radical X represents the group NY where Y is preferably a hydrogen atom. It is preferably present in about 5 to 50 and especially about 10 to 30% by weight of the silica.

According to the invention, water has to be added to the mixture of constituent (a) with the modifying agent before addition of the silica in a quantity of about 0.5 to 20 parts by weight and preferably in a quantity of about 2 to 10 parts by weight, based on the sum of constituents (a), (b), (c) and (d).

The silica is incorporated at room temperature or at slightly elevated temperatures.

The incorporation process is not critical and no particular precautionary measures have to be taken. It is best to add the silica to the mixture of constituent (a), the modifying agent and water in portions rather than all at once so that the particular quantity of silica added is quickly wetted and incorporated. The silica may be dispersed in the mixture of constituent (a), the modifying agent and water by means of standard machines suitable for this purpose, preferably so-called Z-kneaders or planetary stirrers.

The quantity of silica to be incorporated is governed by the required viscosity and the necessary mechanical properties of the vulcanisates. Measurable improvements in the mechanical properties of the vulcanizates accompanied by a slight increase in the viscosity of the mixture but without any significant effect upon flow properties are obtained with additions of as little as 2 to 10% by weight of silica in the final mixture. A distinct improvement in the mechanical properties of the vulcanizates is obtained with additions of at least 15% by weight upwards. There are no upper limits for practical purposes, apart from a reasonable viscosity.

After the silica has been completely incorporated, the mixture containing constituent (a), the modifying agent, water and silica is subjected at elevated temperatures to a mechanical treatment in which the mixture remains in the tightly closed mixer for a period of about 30 minutes to 30 hours. This mechanical treatment is preferably carried out at temperatures of about 80° to 150° C. and, with particular preference, at temperatures of about 100° to 130° C. On completion of the mechanical treatment of the mixture at elevated temperatures, excess modifying agent and water are removed either by applying a vacuum or by opening and venting the mixer at elevated temperature until excess modifying agent and water have completely evaporated.

Constituents (b) and (c) and, optionally, additional fillers such as those described under (e) may be added to the required extent to the mixture obtained in order to influence the viscosity, processing time and physical properties of the vulcanizates.

The invention is illustrated by the following examples. All the parts quoted in these examples are parts by weight. Viscosity was measured at 25° C. with a Viskotester of the type manufactured by the Haake company of Berlin. The mechanical values were determined in accordance with the following Standards:

| Tensile strength | DIN 53 504 | $(Kp/cm^2)$ |
| Elongation at break | DIN 53 504 | (%) |
| Shore-A-hardness | DIN 53 505 | |
| Tear propagation resistance | ASTM-D 624 B | (Kp/cm) |

EXAMPLE 1

In a Z-kneader, 40 g of water and 50 g of hexamethyl disilazane were added to and uniformly dispersed in 550 g of a polydimethyl siloxane containing an Si-bound hydroxyl group in each terminal unit and having a viscosity of 10,000 cP. 150 g of a pyrogenic silica with a BET specific surface area of 200 $m^2/g$ were then slowly kneaded in until a homogeneous mixture was obtained. The mixture was then left in the closed kneader which was kept running for a period of 22 hours at a temperature of 130° C. Excess volatile constituents were then distilled off in vacuo and 300 g of a polydimethyl siloxane containing terminal trimethyl siloxy groups and having a viscosity of 10 cP and 20 g of a polydimethyl siloxane containing an Si-Bound hydroxyl group in each terminal unit and having a viscosity of 30 cP were added to the cooled mixture.

The mixture obtained represents the first component of the two-component silicone rubber.

The second component of the two-component silicone rubber was prepared by mixing the following constituents: 330 g of tetra-n-propoxy silane, 100 g of dibutyl tin dilaurate and 160 g of n-propanol. Crosslinking was obtained by adding 6% by weight of the second component to the first component prepared as described above.

The following processing properties and physical properties were determined:

| Viscosity of the first component after preparation: | 29,600 | cP |
| Viscosity of the first component after storage for 4 weeks: | 32,000 | cP |
| Processing time: | 110 | mins. |
| Tack-free after: | 16 | hours |
| Shore hardness: | 24 | |
| Elongation at break: | 280 | % |
| Tensile strength: | 22 | $kp/cm^2$ |
| Tear propagation resistance: | 5.0 | kp/cm. |

EXAMPLE 2

As in Example 1, a mixture was prepared from 500 g of a polydimethyl siloxane containing an Si-bound hydroxyl group in each terminal unit and having a viscosity of 10,000 cP, 40 g of water, 30 g of hexamethyl disilazane and 200 g of silica with a specific surface area of 200 $m^2/g$. After the processing cycle according to Example 5, 300 g of a polydimethyl siloxane containing terminal trimethyl siloxy groups and having a viscosity of 10 cP and 20 g of a polydimethyl siloxane containing an Si-bound hydroxyl group in each terminal unit and having a viscosity of 30 cP were added.

Crosslinking was carried out in the same way as in Example 1. The following processing properties and physical properties were determined:

| Viscosity of the first component after production: | 35,000 | cP |
| Viscosity of the first component after storage for 4 weeks: | 38,000 | cP |
| Processing time: | 80 | mins. |
| Tack-free after: | 16 | h |
| Shore-A-hardness: | 27 | |
| Elongation at break: | 290 | % |
| Tensile strength: | 25 | $kp/cm^2$ |
| Tear propagation resistance: | 10 | kp/cm. |

EXAMPLE 3

As in Example 1, a mixture was prepared from 530 g of a polydimethyl siloxane containing an Si-bound hydroxyl group in each terminal unit and having a viscosity of 18,000 cP, 35 g of water, 60 g of hexamethyl disilazane and 210 g of silica with a specific surface area of 200 $m^2/g$. After the processing cycle according to Example 5, 250 g of a polydimethyl siloxane containing terminal trimethyl siloxy groups and having a viscosity of 10 cP and 20 g of a polydimethyl siloxane containing an Si-bound hydroxyl group in each terminal unit and having a viscosity of 30 cP were added.

Crosslinking was carried out in the same way as in Example 1. The following processing properties and physical properties were determined:

| | |
|---|---|
| Viscosity of the first component after production: | 64,000 cP |
| Viscosity of the first component after storage for 4 weeks: | 72,000 cP |
| Processing time: | 90 minutes |
| Tack-free after: | 12 h |
| Shore-A-hardness: | 27 |
| Elongation at break: | 390 % |
| Tensile strength: | 35 kp/cm$^2$ |
| Tear propagation resistance: | 19 kp/cm. |

EXAMPLE 4

As in Example 1, a mixture was prepared from 530 g of a polydimethyl siloxane containing an Si-bound hydroxyl group in each terminal unit and having a viscosity of 50,000 cP, 50 g of water, 60 g of hexamethyldisilazane and 220 g of silica with a specific surface area of 200 m$^2$/g. After the processing cycle according to Example 1, 250 g of a polydimethyl siloxane containing terminal trimethyl siloxy groups and having a viscosity of 10 cP and 40 g of a polydimethyl siloxane containing an Si-bound hydroxyl group in each terminal unit and having a viscosity of 30 cP were added.

Crosslinking was carried out in the same way as in Example 1.

The following processing properties and physical properties were determined:

| | |
|---|---|
| Viscosity of the first component after production: | 152,000 cP |
| Viscosity of the first component after storage for 4 weeks: | 176,000 cP |
| Processing time: | 60 mins. |
| Tack-free after: | 12 h |
| Shore-A-hardness: | 24 |
| Elongation at break: | 420 % |
| Tensile strength: | 40 kp/cm$^2$ |
| Tear propagation resistance: | 22 kp/cm. |

EXAMPLE 5

The composition and procedure were the same as described in Example 1, except that, 30 minutes after the temperature of 130° C. had been reached, the volatile constituents were removed and the mixture was cooled.

Crosslinking was carried out in the same way as in Example 1.

The following processing properties and physical properties were determined:

| | |
|---|---|
| Viscosity of the first component after production: | 67,000 cP |
| Viscosity of the first component after storage for 4 weeks: | 76,000 cP |
| Processing time: | 90 minutes |
| Tack-free after: | 15 h |
| Shore-A-hardness: | 32 |
| Elongation at break: | 350 % |
| Tensile strength: | 35 kp/cm$^2$ |
| Tear propagation resistance: | 17 kp/cm. |

EXAMPLE 6

The procedure was the same as described in Example 5, except that a silica with a specific surface area of 130 m$^2$/g was used.

Crosslinking was carried out in the same way as in Example 1.

The following processing properties and physical properties were determined:

| | |
|---|---|
| Viscosity of the first component after production: | 58,000 cP |
| Viscosity of the first component after storage for 4 weeks: | 70,000 cP |
| Processing time: | 100 minutes |
| Tack-free after: | 15 h |
| Shore-A-hardness: | 30 |
| Elongation at break: | 350 % |
| Tensile strength: | 28 kp/cm$^2$ |
| Tear propagation resistance: | 16 kp/cm. |

EXAMPLE 7

The composition and procedure were the same as described in Example 2, except that the polydimethyl siloxane containing an Si-bound hydroxyl group in each terminal unit and having a viscosity of 30 cP was not present in the final mixture.

Crosslinking was carried out in the same way as in Example 1.

The following processing properties and physical properties were determined:

| | |
|---|---|
| Viscosity of the first component after production: | 48,000 cP |
| Viscosity of the first component after storage for 4 weeks: | 190,000 cP |
| Processing time: | 10 minutes |
| Tack-free after: | 30 h. |

After the addition of a quantity of a polydimethyl siloxane containing Si-bound hydroxyl groups and having a viscosity of 30 cP in accordance with Example 2, the processing and physical properties reported in Example 2 were determined.

EXAMPLE 8

As in Example 1, a mixture was prepared from 550 g of a polydimethyl siloxane containing an Si-bound hydroxyl group in each terminal unit and having a viscosity of 10,000 cP, 60 g of water, 70 g of hexamethyl disilazane and 160 g of silica with a specific surface area of 130 m$^2$/g. The mixture was heated to 130° C. and, after this temperature had been reached, the volatile constituents were removed in vacuo. After cooling to 90° C., 300 g of a polydimethyl siloxane containing terminal trimethyl siloxy groups and having a viscosity of 10 cP and 30 g of a polydimethyl siloxane containing an Si-bound hydroxyl group in each terminal unit and having a viscosity of 30 cP were added.

Three different samples of the base mixture thus obtained were mixed with 14% by weight of additional fillers in the form of

| | |
|---|---|
| a) quartz powder<br>b) diatomaceous earth<br>c) zirconium silicate | average particle size 5 μ |

After crosslinking in accordance with Example 1, the following processing and physical properties were determined:

| | Base mixture | a) | b) | c) |
|---|---|---|---|---|
| Viscosity of the first component after production (cP) | 26,300 | 40,000 | 56,000 | 40,000 |
| Viscosity of the first component after storage for | | | | |

-continued

| | Base mixture | a) | b) | c) |
|---|---|---|---|---|
| 4 weeks (cP) | 28,800 | 42,000 | 60,000 | 43,000 |
| Processing time | 110 mins. | 80 mins. | 70 mins. | 80 mins. |
| Tack-free after | 16 h | 16 h | 16 h | 16 h |
| Shore-A-hardness | 26 | 32 | 34 | 29 |
| Elongation at break (%) | 250 | 220 | 200 | 220 |
| Tensile strength (kp/cm$^2$) | 22 | 26 | 30 | 24 |
| Tear propagation resistance (kp/cm) | 5.0 | 7.5 | 8.5 | 6.0 |

EXAMPLE 9

The composition and procedure were the same as described in Example 1, except that no additional water was present during incorporation of the silica and during the heating process. The end product was a thick, poorly flowing mass with a viscosity of 150,000 cP. After storage for 4 weeks, the mixture had assumed a gel-like consistency and was no longer fluid.

A processing time of 10 minutes was determined after crosslinking in accordance with Example 5. After 2 weeks, the crosslinker-containing mixture still had a tacky surface and, in the form of a thick layer, had failed to harden through. Its physical properties could not be determined.

It will be appreciated that the instant specification and examples are set forth by way of illustration and not limitation, and that various modifications and changes may be made without departing from the spirit and scope of the present invention.

What is claimed is:

1. A vulcanized silicone rubber produced by mixing and vulcanizing a two-component system, component I consisting essentially of (a) about 20 to 100 parts by weight of a linear organopolysiloxane of the formula

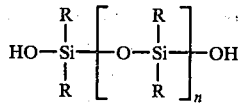

in which
R each independently is a monofunctional hydrocarbon radical, and
n is a positive integer of a value such that the viscosity amounts to between about 500 and 1,000,000 cP at a temperature of 25° C., (b) 0 to about 50 parts by weight of a linear organopolysiloxane of the formula

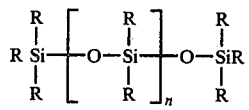

in which
n is a positive integer of a value such that the viscosity amounts to between about 5 and 1,000 cP at a temperature of 25° C., (c) 0 to about 20 parts by weight of a linear organopolysiloxane of the formula

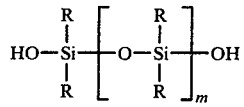

in which
R and n are as defined above,
m is a positive integer of a value such that the viscosity amounts to between about 2 and 50 cP at a temperature of 25° C., (d) about 10 to 50 parts by weight of a very finely divided pyrogenic silica with a specific surface area according to BET of at least about 50 m$^2$/g, and (e) 0 to about 100 parts by weight of another filler or pigment, component I being a mixture obtained by mixing constituents a) and d) in the presence of water and a modifying agent of the formula (R$_3$Si)$_p$X in which
R and n are as defined above,
p is 1 or 2,
X is OH, OR, halogen, S, OOCR, NH, NH$_2$, NHY, NY or NY$_2$, and
Y is a monofunctional hydrocarbon radical, and subsequently adding the constituents (b), (c) and (e), and component II consisting essentially of (f) about 20 to 50 parts by weight of a silicic acid ester of the formula (RO)$_3$SiR' in which
R is as defined above,
R' is an alkyl or alkoxy radical with up to 6 carbon atoms, (g) about 1 to 20 parts by weight of a catalytically active heavy metal compound, and (h) 0 to about 50 parts by weight of a monohydric aliphatic alcohol of the formula (R—(CH$_2$)$_a$—OH in which
R is as defined above, and
a is an integer from 1 to about 10.

2. A rubber according to claim 1, wherein a is an integer from about 2 to 5.

3. A rubber according to claim 1, wherein the modifying agent is hexamethyl disilazane.

4. A rubber as claimed in claim 1, wherein the modifying agent is used in the presence of about 3 to 20% by weight of water based on component I.

5. A rubber according to claim 1, wherein in (a) and (b) at least about 70% of the radicals R are methyl and the balance if any are vinyl or phenyl, the viscosity of a) ranging from about 5,000 to 20,000 cP at 25° C., the viscosity of (b) and (c) ranging from about 10 to 50 cP at 25° C., the specific surface area of (d) ranging from about 120 to 250 m$^2$/g, component (e) if present is in up to about 50 parts by weight, in at least about 2 to 5 parts of (f) R being ethyl or n-propyl and R' being ethoxy or n-propoxy, the heavy metal of (g) being lead, tin, zirconium, antimony, iron, cadmium, barium, calcium, titanium, bismuth or manganese, and in (h) R is methyl, the modifying agent having been used in the presence of about 3 to 20% by weight of water based on component I.

* * * * *